US010921469B2

(12) United States Patent
Horiuchi et al.

(10) Patent No.: US 10,921,469 B2
(45) Date of Patent: Feb. 16, 2021

(54) RADIATION DETECTION DEVICE AND METHOD OF MANUFACTURING RADIATION DETECTION DEVICE

(71) Applicant: FUJIFILM Corporation, Tokyo (JP)

(72) Inventors: Hisatsugu Horiuchi, Kanagawa (JP); Masateru Tateishi, Kanagawa (JP); Shinsuke Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 16/569,237

(22) Filed: Sep. 12, 2019

(65) Prior Publication Data

US 2020/0103539 A1 Apr. 2, 2020

(30) Foreign Application Priority Data

Sep. 28, 2018 (JP) ................... 2018-184313

(51) Int. Cl.
*G01J 1/00* (2006.01)
*G01T 7/00* (2006.01)

(52) U.S. Cl.
CPC ...................... *G01T 7/00* (2013.01)

(58) Field of Classification Search
CPC .... G01T 7/00; G01T 1/20; A61B 6/44; A61B 6/4208; G03B 42/02
See application file for complete search history.

(56) References Cited

U.S. PATENT DOCUMENTS 10,325,460 B2 6/2019 Kano et al.
2017/0367666 A1* 12/2017 Horiuchi .............. A61B 6/4283

FOREIGN PATENT DOCUMENTS

JP 2018-4262 A 1/2018

* cited by examiner

*Primary Examiner* — Kiho Kim
(74) *Attorney, Agent, or Firm* — Birch, Stewart, Kolasch & Birch, LLP

(57) ABSTRACT

Provided are a radiation detection device, in which the peeling of a sheet material that covers the outer peripheral surface can be suppressed, and a method of manufacturing a radiation detection device. A radiation detection device includes: a front surface member; a rear surface member assembled with the front surface member; a radiation detection panel disposed between the front surface member and the rear surface member and detecting radiation incident from the front surface member side; a sheet material that covers an outer peripheral surface of at least one of the front surface member or the rear surface member; a packing, the sheet material being interposed between the packing and the front surface member or the rear surface member; and a holding portion provided in at least one of the front surface member or the rear surface member and holding the packing in a pressed state.

11 Claims, 12 Drawing Sheets

RADIATION DETECTION DEVICE AND METHOD OF MANUFACTURING RADIATION DETECTION DEVICE

CROSS-REFERENCE TO RELATED APPLICATION

This application claims priority under 35 USC 119 from Japanese Patent Application No. 2018-184313 filed Sep. 28, 2018, the disclosure of which is incorporated by reference herein.

BACKGROUND

Technical Field

The present disclosure relates to a radiation detection device and a method of manufacturing a radiation detection device.

Related Art

JP2018-004262A discloses a structure of a radiation detection cassette in which a radiation detector is housed inside a housing formed using a transmission plate, a frame body, and a back surface housing portion. In this radiation detection cassette, the back surface housing portion is covered with a protective film to improve corrosion resistance and scratch resistance.

SUMMARY

The protective film disclosed in JP2018-004262A is provided from the back surface housing portion to the outer surface of the frame body, and the end portion is exposed to the outside of the radiation detection cassette. In a case where the protective film is peeled off from the end portion, the effect of improving the corrosion resistance and the scratch resistance is reduced.

Therefore, it is an object of the present disclosure to provide a radiation detection device, in which the peeling of a sheet material that covers the outer peripheral surface can be suppressed, and a method of manufacturing a radiation detection device.

In order to achieve the aforementioned object, a radiation detection device according to the present disclosure comprises: a front surface member; a rear surface member assembled with the front surface member; a radiation detection panel that is disposed between the front surface member and the rear surface member and detects radiation incident from the front surface member side; a sheet material that covers an outer peripheral surface of at least one of the front surface member or the rear surface member; a packing, the sheet material being interposed between the packing and the front surface member or the rear surface member; and a holding portion that is provided in at least one of the front surface member or the rear surface member and holds the packing in a pressed state.

In the radiation detection device according to the present disclosure, the sheet materials cover outer peripheral surfaces of both the front surface member and the rear surface member, the holding portion is a groove provided in either the front surface member or the rear surface member, an end portion of one of the sheet materials is inserted into the groove, and an end portion of the other sheet material is interposed between the front surface member and the rear surface member.

In the radiation detection device according to the present disclosure, the end portion of the one sheet material is disposed along a groove wall of the groove.

In the radiation detection device according to the present disclosure, the sheet materials cover outer peripheral surfaces of both the front surface member and the rear surface member, the holding portion is grooves provided in both the front surface member and the rear surface member, an end portion of one of the sheet materials is inserted into one of the grooves, and the other sheet material is pressed against a groove bottom of the other groove by the packing, and an end portion of the other sheet material is interposed between the front surface member and the rear surface member.

In the radiation detection device according to the present disclosure, the sheet materials cover outer peripheral surfaces of both the front surface member and the rear surface member, the holding portion is a space interposed between an inner wall protruding from the front surface member toward the rear surface member and an outer wall protruding from the rear surface member toward the front surface member, one of the sheet materials is disposed along the inner wall, and the other sheet material is disposed along the outer wall.

In the radiation detection device according to the present disclosure, the sheet material covers an outer peripheral surface of one of the front surface member and the rear surface member, the holding portion is a groove provided in one of the front surface member and the rear surface member, and the sheet material is interposed between the packing and the front surface member or the rear surface member covered with the sheet material.

In the radiation detection device according to the present disclosure, an angle formed by a side surface of the front surface member covered with the sheet material and an opposite surface of the front surface member facing the rear surface member and an angle formed by a side surface of the rear surface member covered with the sheet material and an opposite surface of the rear surface member facing the front surface member are 45° or more.

In the radiation detection device according to the present disclosure, each of the front surface member and the rear surface member has a quadrangular shape with a corner portion formed in a curved shape, and each of an opposite surface of the front surface member facing the rear surface member and an opposite surface of the rear surface member facing the front surface member has a frame shape and a width of the corner portion is larger than widths of other portions.

In the radiation detection device according to the present disclosure, a support plate that supports the radiation detection panel is disposed between the front surface member and the rear surface member, and the support plate is formed of a MgLi alloy.

A method of manufacturing a radiation detection device according to the present disclosure comprises: a step of covering outer peripheral surfaces of a front surface member and a rear surface member with sheet materials; a step of inserting an end portion of one of the sheet materials into a groove provided on an opposite surface of the front surface member facing the rear surface member and disposing a packing in the groove; a step of disposing the other sheet material along an opposite surface of the rear surface member facing the front surface member; and a step of assembling the front surface member and the rear surface member to press the packing and interposing the other sheet material between the packing and the opposite surface.

In the method of manufacturing a radiation detection device according to the present disclosure, the one sheet material is heated and softened before covering the outer peripheral surface of the front surface member with the one sheet material, the front surface member is pressed against the one sheet material, which has been softened, at the time of covering the outer peripheral surface of the front surface member with the one sheet material, the other sheet material is heated and softened before covering the outer peripheral surface of the rear surface member with the other sheet material, and the rear surface member is pressed against the other sheet material, which has been softened, at the time of covering the outer peripheral surface of the rear surface member with the other sheet material.

In the radiation detection device and the method of manufacturing a radiation detection device according to the present disclosure, since the outer peripheral surface of at least one of the front surface member or the rear surface member is covered with the sheet material, the corrosion resistance of a portion covered with the sheet material is improved, and external damage does not easily occur even in a case where friction with the outside occurs.

In addition, the sheet material is interposed between the packing in a pressed state and the front surface member or the rear surface member. For this reason, peeling of the sheet material is suppressed.

BRIEF DESCRIPTION OF THE DRAWINGS

Exemplary Embodiments of the present invention will be described in detail with reference to the following figures, wherein.

DETAILED DESCRIPTION

Radiation Detection Device

Figure 1:
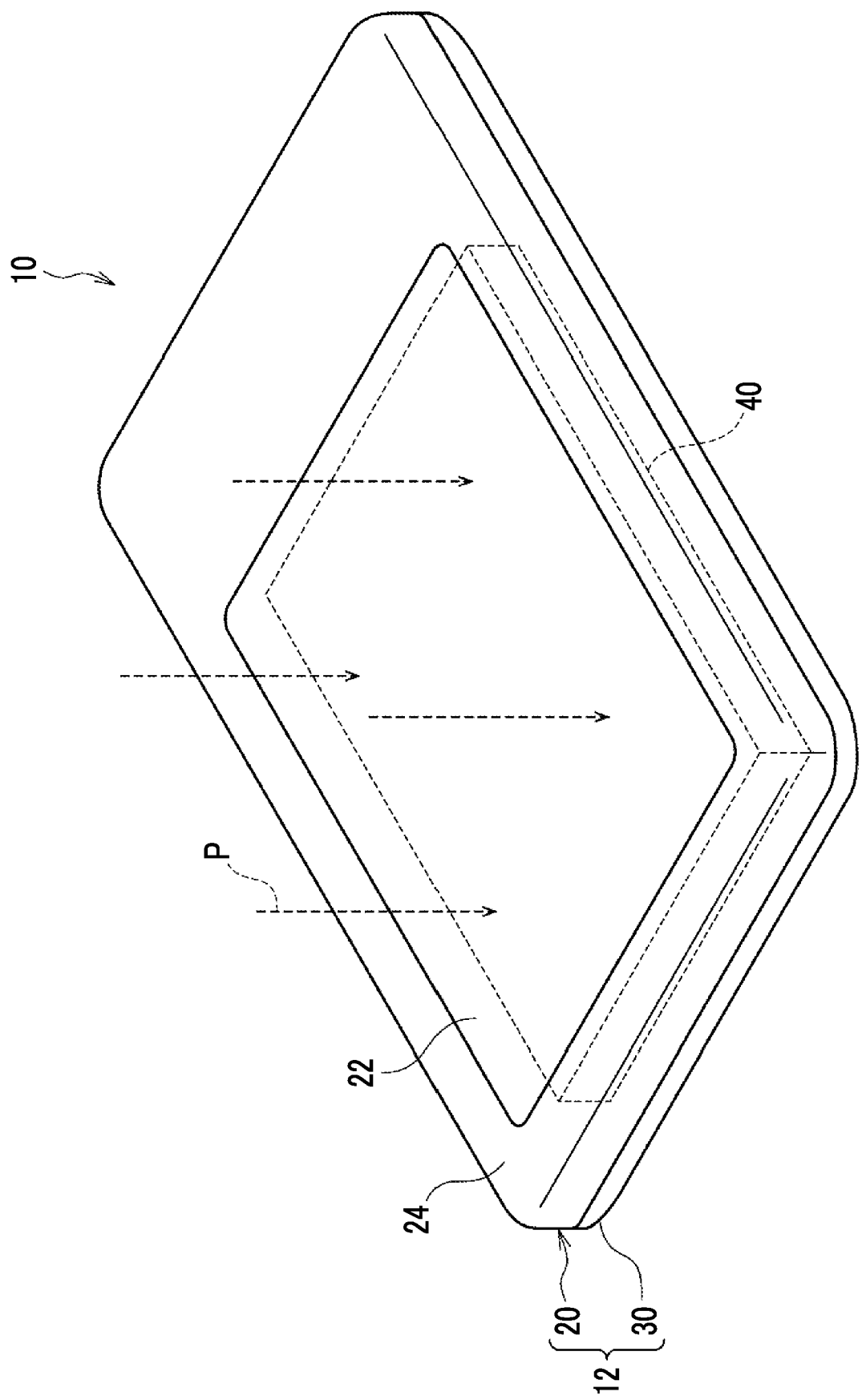
FIG. 1 is a perspective view showing a radiation detection device according to the present embodiment.

FIG. 1 is a schematic perspective view of a radiation detection device 10 according to an embodiment of the present disclosure. The radiation detection device 10 is an electronic cassette having an approximately rectangular shape (quadrangular shape) in a plan view, and is configured such that a radiation detection panel 40 is disposed inside a housing 12 configured to include a front surface member 20 and a rear surface member 30.

The planar size of the housing 12 is, for example, a size according to the international standard ISO4090: 2001 similar to a half size (383.5 mm×459.5 mm) film cassette or imaging plate (IP) cassette. Therefore, the radiation detection device 10 can also be used in a state in which the radiation detection device 10 is attached to an imaging table for a film cassette or an IP cassette.

The front surface member 20 attached to the rear surface member 30 is configured to include an approximately rectangular transmission plate 22 and a frame member 24 in which the transmission plate 22 is fitted. The transmission plate 22 is formed of, for example, a carbon material having a high X-ray transmittance. Radiation (in the present embodiment, X-ray P) is incident from a direction approximately perpendicular to the in-plane direction of the transmission plate 22.

The outer peripheral surfaces of the frame member 24 and the transmission plate 22 are covered with a sheet material 72 to be described later. However, the sheet material 72 is omitted in FIG. 1 in order to clarify the configuration.

The frame member 24 in the front surface member 20 and the rear surface member 30 are formed by die casting using a magnesium alloy (Mg alloy) in the present embodiment. However, the material and manufacturing method of the frame member 24 and the rear surface member 30 are not limited thereto, and the frame member 24 and the rear surface member 30 can be molded using various metals, resins, and the like.

Figure 2:
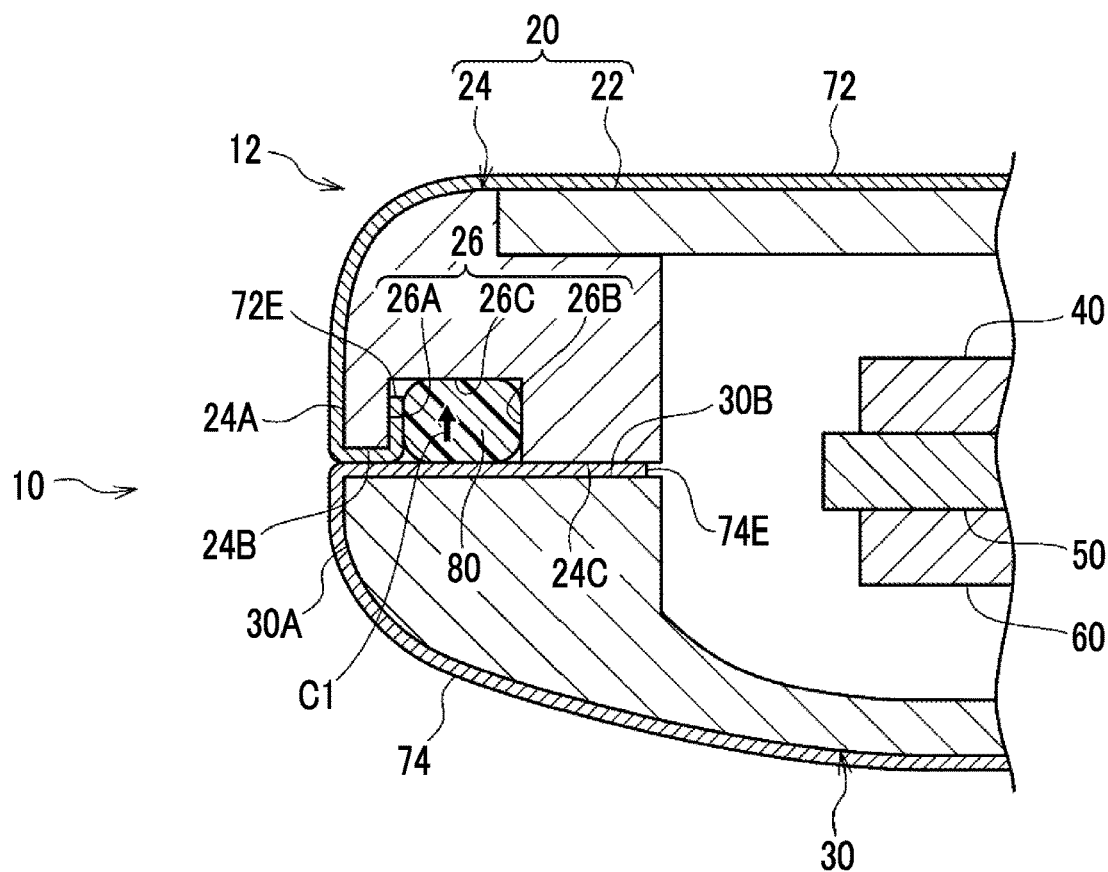
FIG. 2 is a partially enlarged cross-sectional view of the radiation detection device according to the present embodiment.

FIG. 2 shows a partial cross-sectional view of the housing 12. As shown in FIG. 2, the radiation detection panel 40, a support plate 50 to which the radiation detection panel 40 is attached, and a control substrate 60 for controlling the radiation detection panel 40 are provided inside the housing 12 so as to be interposed between the front surface member 20 and the rear surface member 30.

The support plate 50 is formed using a magnesium lithium alloy (MgLi alloy). The MgLi alloy has a smaller specific gravity than, for example, stainless steel and the like.

The radiation detection device 10 shown in FIG. 1 is formed by assembling the front surface member 20, the rear surface member 30, the radiation detection panel 40, the support plate 50, the control substrate 60, a battery (not shown), and the like.

Water Blocking Mechanism

As shown in FIG. 2, the radiation detection device 10 comprises a water blocking mechanism for protecting the radiation detection panel 40, the support plate 50, and the control substrate 60 disposed inside the housing 12 from liquid. The water blocking mechanism is formed to include a groove 26 and a packing 80 as an example.

The groove 26 is an example of a holding portion in the present disclosure, and is an annular groove formed on an opposite surface of the frame member 24 in the front surface member 20 facing the rear surface member 30. The groove 26 is formed to include an outer groove wall 26A, an inner groove wall 26B facing the groove wall 26A, and a groove bottom 26C formed between the groove wall 26A and the groove wall 26B.

The groove wall 26B is formed to be higher than the groove wall 26A. Therefore, on the opposite surface of the frame member 24 facing the rear surface member 30, an opposite surface 24C formed on the inner side of the groove 26 is disposed closer to the rear surface member 30 than an opposite surface 24B formed on the outer side of the groove 26. As a result, on the outer side of the groove 26, a gap in which the sheet material 72 to be described later is interposed is secured between the opposite surface 24B and the opposite surface 30B.

The packing 80 is inserted into the groove 26. The packing 80 is a water blocking member formed in an annular shape along the shape of the groove 26, and is formed using silicon. The material of the packing 80 is not limited to silicon, and resin materials, such as nitrile rubber (NBR) and urethane, can be used. In addition, as the packing 80, one molded in advance may be used, or one that is injected from a dispenser into the groove 26 and hardened by ultraviolet light may be used.

The packing 80 is inserted into the groove 26, and receives a compressive force (pressing force) from the groove wall 26A and the groove wall 26B in a state in which the front surface member 20 and the rear surface member 30 are assembled. In addition, the packing 80 receives a compressive force (pressing force) from the groove bottom 26C and the opposite surface 30B of the rear surface member 30 facing the front surface member 20. That is, in the inside the groove 26, the packing 80 is compressed along the facing direction of the front surface member 20 and the rear surface member 30 and compressed along the facing direction of the groove wall 26A and the groove wall 26B. As a result, in the inside of the packing 80, a stress (repulsive force) that is elastically restored in each direction is generated.

Sheet Material

As shown in FIG. 2, the outer peripheral surfaces of the front surface member 20 and the rear surface member 30 are covered with sheet materials 72 and 74, respectively. The sheet materials 72 and 74 are formed of vinyl chloride, and can be expanded and contracted by being softened by heating and applying an external force. The sheet materials 72 and 74 can improve the corrosion resistance and the scratch resistance of the front surface member 20 and the rear surface member 30. The sheet materials 72 and 74 can also be used for the purpose of improving the design or for the purpose of improving the operability of the radiation detection device 10 by using characters or symbols.

The sheet material 72 is bonded to the outer peripheral surfaces of the transmission plate 22 and the frame member 24, and is folded from a side surface 24A of the frame member 24 to the opposite surface 24B facing the rear surface member 30 and an end portion 72E is inserted into the groove 26. The end portion 72E is disposed along the groove wall 26A. Accordingly, the end portion 72E is pressed against the groove wall 26A by the repulsive force of the packing 80 being compressed and deformed. In other words, the end portion 72E of the sheet material 72 is interposed between the groove wall 26A and the packing 80.

In the frame member 24, an angle formed by the side surface 24A and the opposite surface 24B is about 90°, and the bending angle of the sheet material 72 is about 90°.

The sheet material 74 is bonded to the outer peripheral surface of the rear surface member 30 and is folded from a side surface 30A of the rear surface member 30 to the opposite surface 30B of the front surface member 20 facing the frame member 24, and an end portion 74E is interposed between the opposite surface 24C and the opposite surface 30B. The sheet material 74 is interposed between the opposite surface 30B and the packing 80 at a portion outside the end portion 74E. Accordingly, the sheet material 74 is pressed against the opposite surface 30B by the repulsive force of the packing 80 being compressed and deformed. In other words, the sheet material 74 is interposed between the opposite surface 30B and the packing 80. In addition, the end portion 74E of the sheet material 74 is interposed between the opposite surface 30B and the opposite surface 24C.

In the rear surface member 30, an angle formed by the side surface 30A and the opposite surface 30B is about 90°, and the bending angle of the sheet material 74 is about 90°. The side surface 30A and the side surface 24A are disposed approximately evenly.

Figure 3:
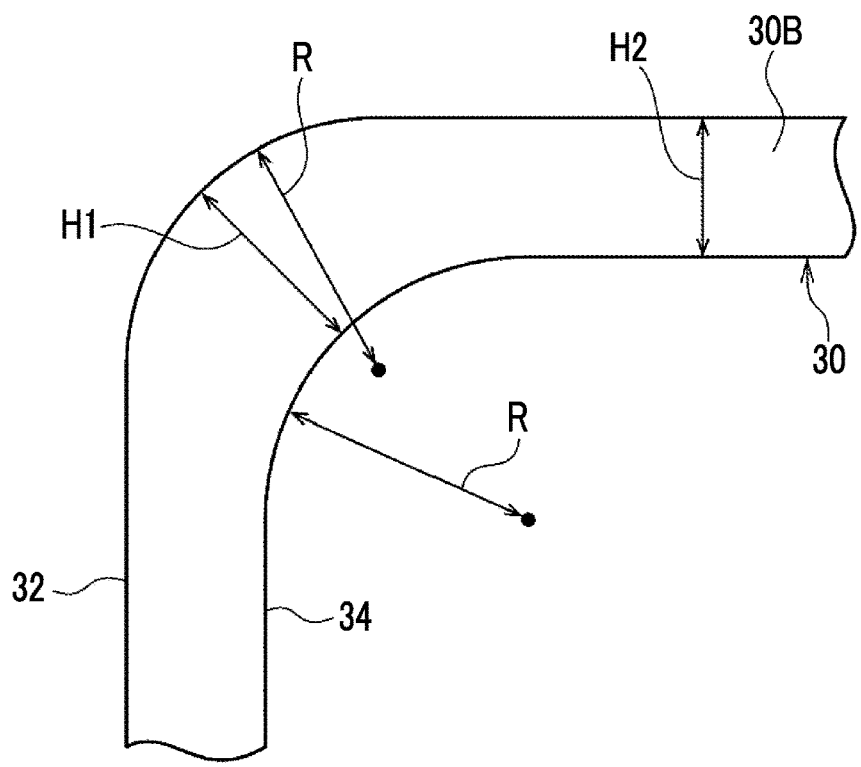
FIG. 3 is a partially enlarged plan view of a rear surface member in the radiation detection device according to the present embodiment.

As shown in FIG. 3, the opposite surface 30B of the rear surface member 30 is formed in a frame shape, and the corner portion is chamfered in a curved shape in a plan view. An outer edge 32 and an inner edge 34 of the opposite surface 30B are formed parallel to each other at portions other than the corner portion, and the curved chamfering radii at the corner portion are equal to each other (arc of radius R). Therefore, the width H1 of the opposite surface 30B at the corner portion is set to be larger than the width H2 at a portion other than the corner portion.

The method of setting the width H1 of the opposite surface 30B at the corner portion to be larger than the width H2 at a portion other than the corner portion is not limited to those described above. For example, a curved chamfer may be formed at the edge 32, and a linear chamfer may be formed at the edge 34.

Figure 4:
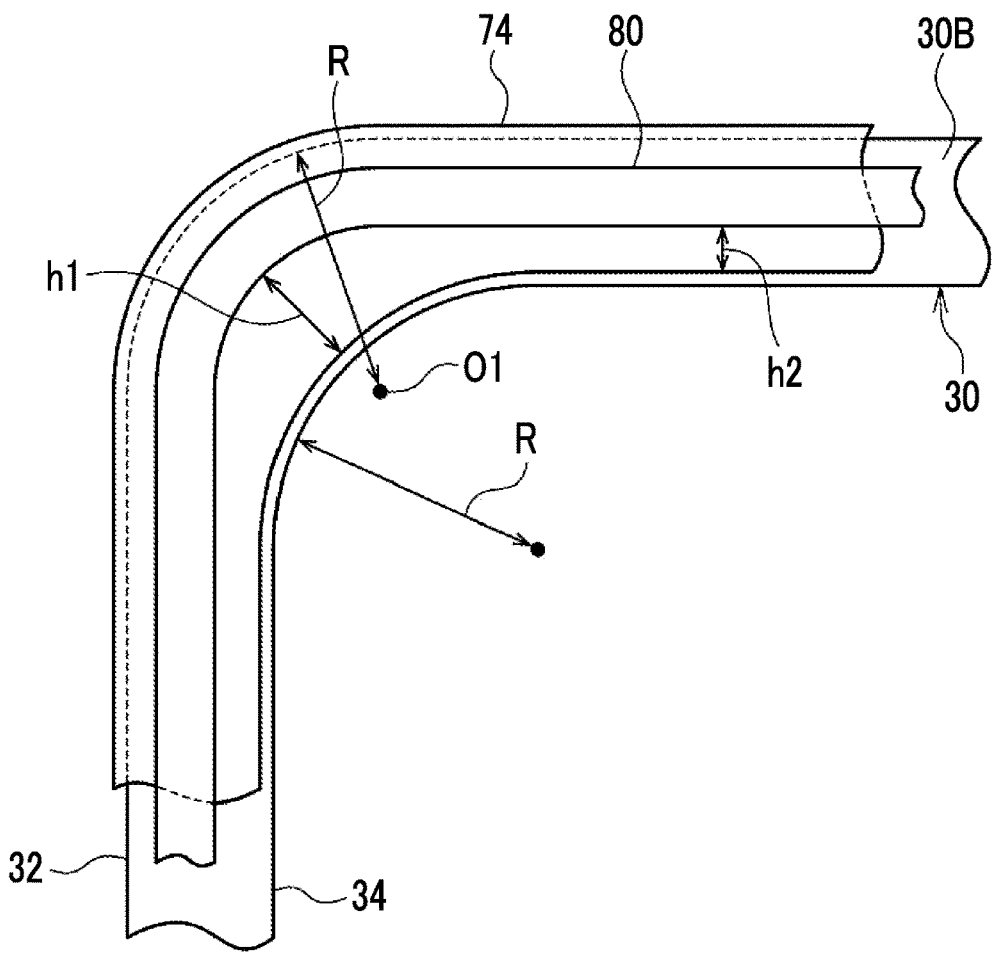
FIG. 4 is a partially enlarged plan view showing a positional relationship between the rear surface member, a sheet material, and a packing in the radiation detection device according to the present embodiment.

FIG. 4 shows a state in which the sheet material 74 is folded on the opposite surface 30B to dispose the packing 80. Although the front surface member 20 is not shown, the arrangement of the packing 80 is approximately equal to the arrangement of the groove 26 in FIG. 2. The packing 80 and the groove 26 are disposed along the edge 32 of the rear surface member 30 in a plan view, and are disposed along the concentric circle (center point O1) of the arc forming the edge 32 at the corner portion.

Therefore, in the sheet material 74, the width of a portion disposed on the inner side from a portion pressed by the packing 80 is large at the corner portion (width h1) and small at the other portions (width h2).

Method of Manufacturing a Radiation Detection Device

Figure 5:
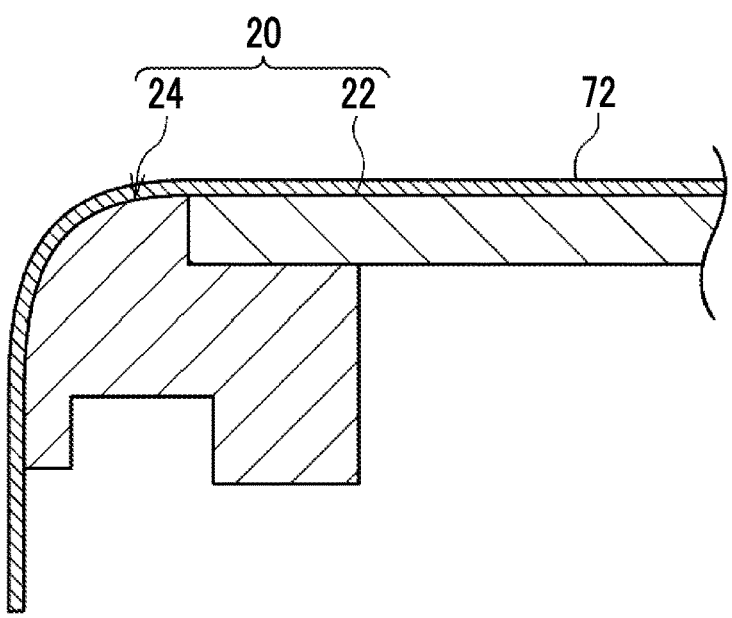
FIG. 5 is a partially enlarged cross-sectional view showing a state in which the outer peripheral surface of a front surface member is covered with a sheet material in a method of manufacturing a radiation detection device according to the present embodiment.

In order to manufacture the radiation detection device 10, as shown in FIG. 5, the outer peripheral surface of the front surface member 20 is covered with the sheet material 72 first. In order to cover the front surface member 20 with the sheet material 72, as an example, the sheet material 72 is disposed inside an airtight container, so that the inside of the airtight container is divided into two spaces by the sheet material 72.

Then, the sheet material 72 is heated from one space to soften the sheet material 72. The outer peripheral surface of the front surface member 20 disposed in the other space is pressed against the softened sheet material 72. In this case, it is preferable to apply negative pressure to the space in which the front surface member 20 is disposed. Then, the sheet material 72 is sucked to be closely attached to the front surface member 20. It is preferable to apply an adhesive on a surface of the sheet material 72 in contact with the front surface member 20 in advance. Alternatively, the sheet material 72 itself may be heat-welded without using an adhesive. Since the method of covering the rear surface member 30 with the sheet material 74 is also the same, the description thereof will be omitted.

The method of covering the front surface member 20 and the rear surface member 30 with the sheet materials 72 and 74 is not limited to those described above, and these sheet materials do not necessarily need to be disposed inside the airtight container.

In addition, since both the front surface member 20 and the rear surface member 30 are formed of metal in the present embodiment, it is preferable to cover the front surface member 20 and the rear surface member 30 with a sheet material after molding. However, the embodiment of the present disclosure is not limited thereto. For example, in a case where the front surface member 20 and the rear surface member 30 are molded of a resin material, the sheet materials 72 and 74 may be attached to a mold for molding. In this case, molding of the front surface member 20 and the rear surface member 30 and covering using the sheet materials 72 and 74 can be performed simultaneously.

Figure 6:
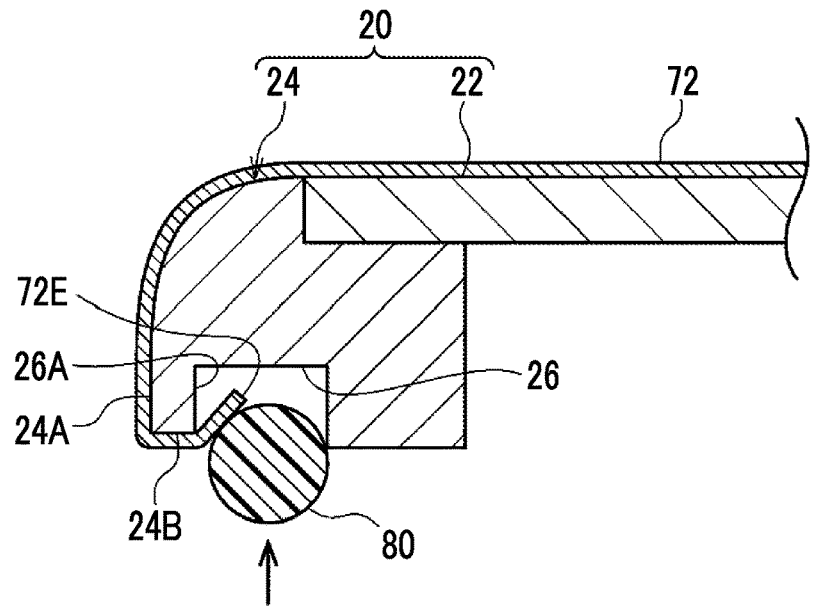
FIG. 6 is a partially enlarged cross-sectional view showing a state in which a packing is inserted into a groove of the front surface member in the method of manufacturing a radiation detection device according to the present embodiment.

Then, as shown in FIG. 6, the sheet material 72 is folded along the angle formed by the side surface 24A and the opposite surface 24B of the frame member 24, and the packing 80 is inserted into the groove 26 so that the end portion 72E of the sheet material 72 is inserted into the groove 26. As a result, the end portion 72E of the sheet material 72 is pressed against the groove wall 26A. Alternatively, the end portion 72E of the sheet material 72 is held in the groove 26.

Figure 7:
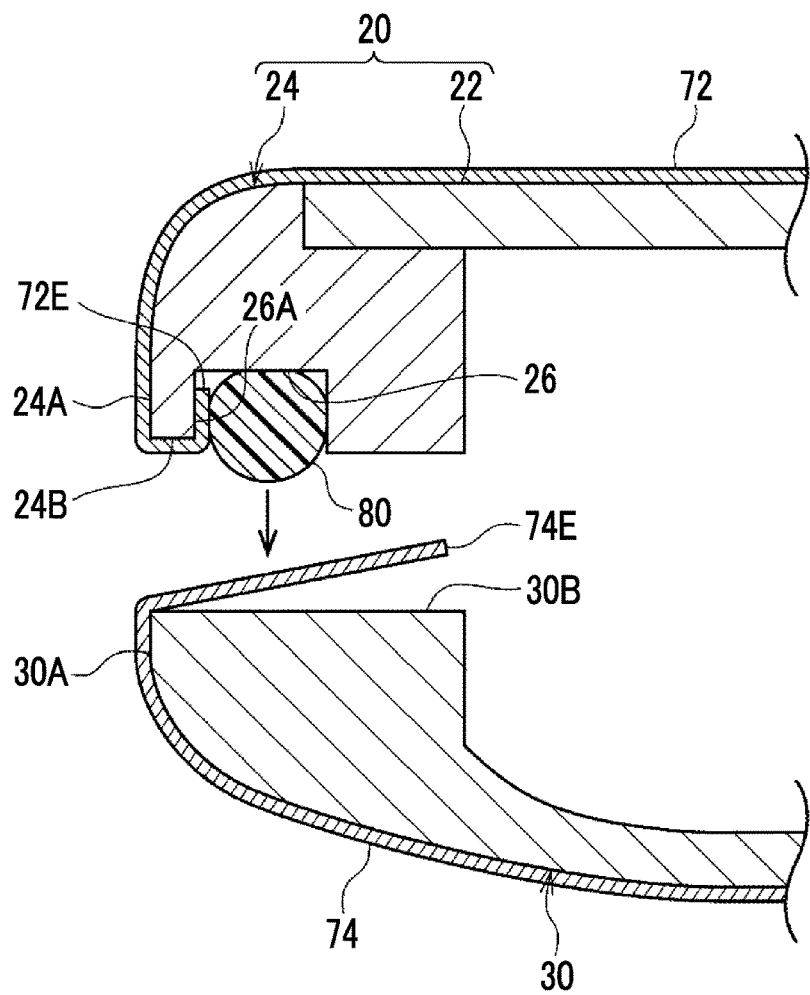
FIG. 7 is a partially enlarged cross-sectional view showing a state in which the front surface member and the rear surface member are assembled in the method of manufacturing a radiation detection device according to the present embodiment.

Then, as shown in FIG. 7, the sheet material 74 is folded along the angle formed by the side surface 30A and the opposite surface 30B of the rear surface member 30, so that the sheet material 74 is disposed along the opposite surface 30B. The sheet material 74 is interposed between the rear surface member 30 and the front surface member 20 by assembling the rear surface member 30 and the front surface member 20. In addition, the packing 80 is pressed by assembling the rear surface member 30 and the front surface member 20, thereby being compressed and deformed.

In a case where the sheet material 74 is disposed along the opposite surface 30B, wrinkles may be generated at the corner portion shown in FIG. 4. In this case, the generated wrinkles may be made to overlap each other, or the sheet material 74 may be appropriately cut so that no wrinkle is generated. Alternatively, the generation of wrinkles may be suppressed by expanding and contracting the sheet material 74 by heating.

In the radiation detection device 10 according to the present disclosure, as shown in FIG. 2, the radiation detection panel 40 is disposed inside the housing 12 formed by the front surface member 20 and the rear surface member 30. Since the packing 80 is held between the front surface member 20 and the rear surface member 30 in a pressed state, the radiation detection panel 40 is protected from liquid, such as water or chemicals. Similarly, the support plate 50 and the control substrate 60 are also protected from liquid. Therefore, since the failure of the radiation detection panel 40 and the control substrate 60 that are electrical devices is suppressed, it is possible to suppress the corrosion of the support plate 50 formed of a MgLi alloy.

As described above, the MgLi alloy has a smaller specific gravity than, for example, stainless steel and the like. For this reason, by using the MgLi alloy as the support plate 50, the weight can be reduced as compared with a case where stainless steel is used and the like. On the other hand, the MgLi alloy is more susceptible to corrosion than, for example, stainless steel and the like. According to the present embodiment, the corrosion of the support plate 50 is suppressed by the water blocking mechanism. As a result, both the weight reduction and the corrosion resistance of the support plate 50 are realized.

As examples of a material that can be reduced in weight more than stainless steel, metal-based materials, such as a Mg alloy or an aluminum (Al) alloy other than the MgLi alloy, can be used. As another example, a carbon material can be used, or fiber-reinforced plastics (FRP) and the like can be used.

As still another example, it is possible to use resin materials, such as polyetheretherketone (PEEK) resin, liquid crystal polymer (LCP) resin, polycarbonate (PC) resin, acrylonitrile butadiene styrene (ABS) resin, high density polyethylene (HDPE) resin, and modified-polyphenyleneether (PPE) resin.

As still another example, it is possible to use composite resin materials (reinforced plastics) reinforced by adding glass fiber, cellulose fiber, and magnesium fiber to the resin materials.

In the radiation detection device 10, since the outer peripheral surfaces of both the front surface member 20 and the rear surface member 30 are covered with the sheet materials 72 and 74, the corrosion resistance is improved, and external damage does not easily occur even in a case where friction with the outside occurs.

The sheet material 72 is interposed between the front surface member 20 and the packing 80 in a pressed state. Specifically, the end portion 72E is interposed between the packing 80 and the groove wall 26A. Therefore, since the end portion 72E is not easily shifted, peeling of the sheet material 72 is suppressed.

In a case where the front surface member 20 and the rear surface member 30 are assembled, the packing 80 is pressed against the rear surface member 30 to be compressed and deformed in a direction shown by the arrow C1. Accordingly, the end portion 72E of the sheet material 72 receives a tensile force in a direction toward the groove bottom 26C, so that it is possible to increase the adhesion of the sheet material 72 to the front surface member 20.

The sheet material 74 is interposed between the rear surface member 30 and the packing 80 in a pressed state. Specifically, in the sheet material 74, an outer portion of the end portion 74E is interposed between the packing 80 and the opposite surface 30B of the rear surface member 30, and the end portion 74E of the sheet material 74 is interposed between the opposite surface 24C of the front surface member 20 and the opposite surface 30B. For this reason, peeling of the sheet material 74 is suppressed.

As described above, in the radiation detection device 10 according to the present disclosure, the water blocking structure formed by the packing 80 and the groove 26 serves as a peeling suppression structure of the sheet material 72 and the sheet material 74. Therefore, for example, compared with a case where the water blocking structure is provided separately from the peeling suppression structure, the configuration of the radiation detection device 10 can be simplified.

In the radiation detection device 10, in the frame member 24, an angle formed by the side surface 24A and the opposite surface 24B is about 90°, and the bending angle of the sheet material 72 is about 90°. Similarly, in the rear surface member 30, an angle formed by the side surface 30A and the opposite surface 30B is about 90°, and the bending angle of the sheet material 74 is about 90°.

In this manner, the sheet material 72 and the sheet material 74 are prevented from returning and deforming in a direction in which the bending angle increases with the bending point as a base point. In addition, since the local pressure that the sheet materials 72 and 74 receive from the corner portion formed by the side surface 24A and the opposite surface 24B and the corner portion formed by the side surface 30A and the opposite surface 30B is reduced, damage to the sheet materials 72 and 74 with the bending point as a base point is suppressed.

In the present embodiment, both the angle formed by the side surface 24A and the opposite surface 24B and the angle formed by the side surface 30A and the opposite surface 30B are about 90°. However, the embodiment of the present disclosure is not limited thereto, and these angles may be 45° or more in order to suppress return deformation. In addition, in order to configure the side surface 30A and the side surface 24A approximately evenly, it is preferable that these angles are less than 135°.

Figure 15:
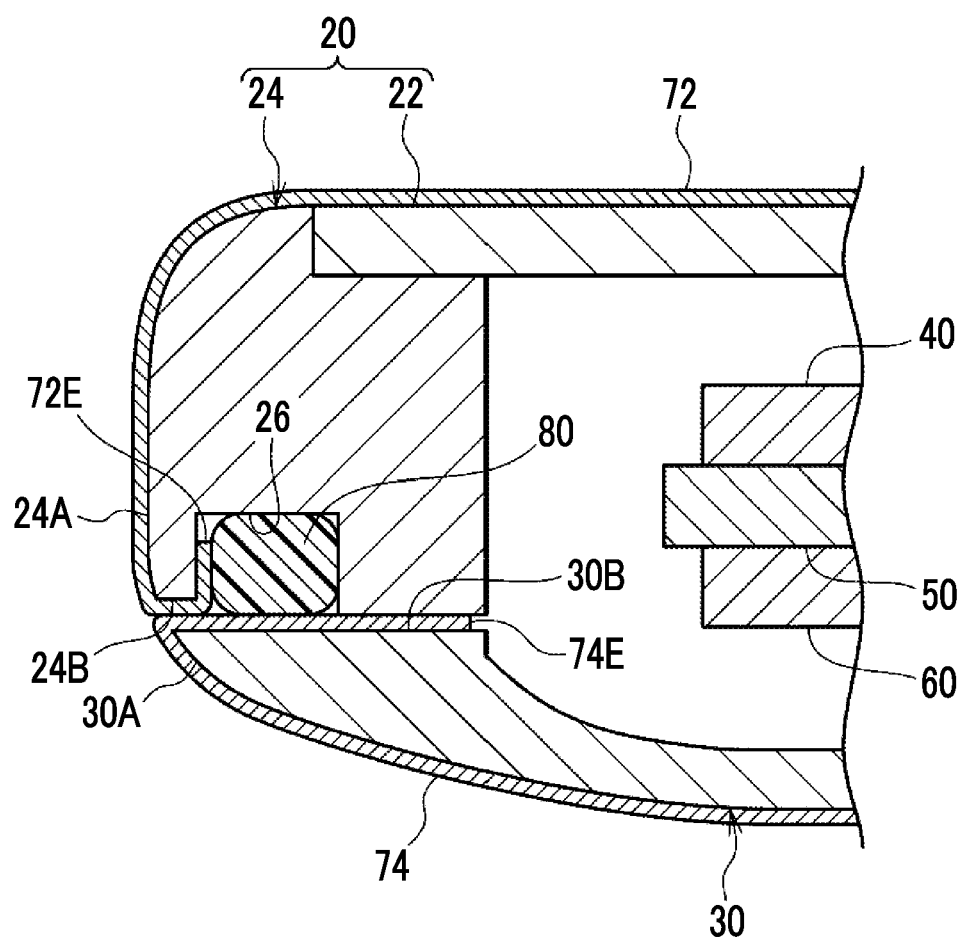
FIG. 15 is a partially enlarged cross-sectional view showing a modification example in which an angle formed by the side surface of the rear surface member and the opposite surface of the rear surface member facing the front surface member is less than 45°.

As shown in FIG. 15, for example, in a case where the sheet material 74 has high plasticity and high strength, the angle formed by the side surface 30A and the opposite surface 30B may be less than 45°. The same applies to the angle formed by the side surface 24A and the opposite surface 24B. In a case where these angles are less than 45°, it is suitable to appropriately form a chamfer at the corners.

Figure 8:
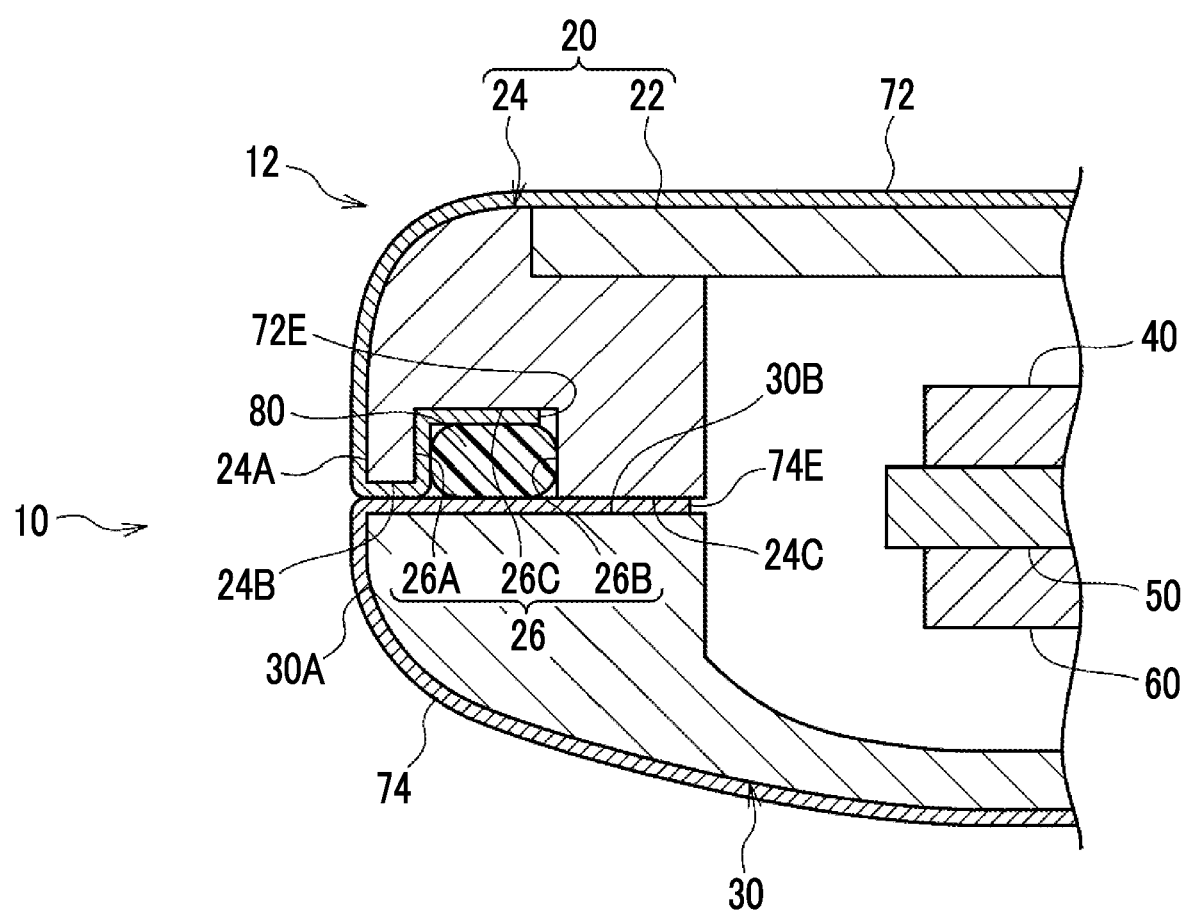
FIG. 8 is a partially enlarged cross-sectional view showing a modification example in which an end portion of the sheet material that covers the front surface member is disposed along a groove bottom in the radiation detection device according to the present embodiment.

In the present embodiment, the end portion 72E of the sheet material 72 is disposed along the groove wall 26A. However, the embodiment of the present disclosure is not limited thereto. For example, as shown in FIG. 8, the end portion 72E may be disposed along the groove bottom 26C.

Figure 9:
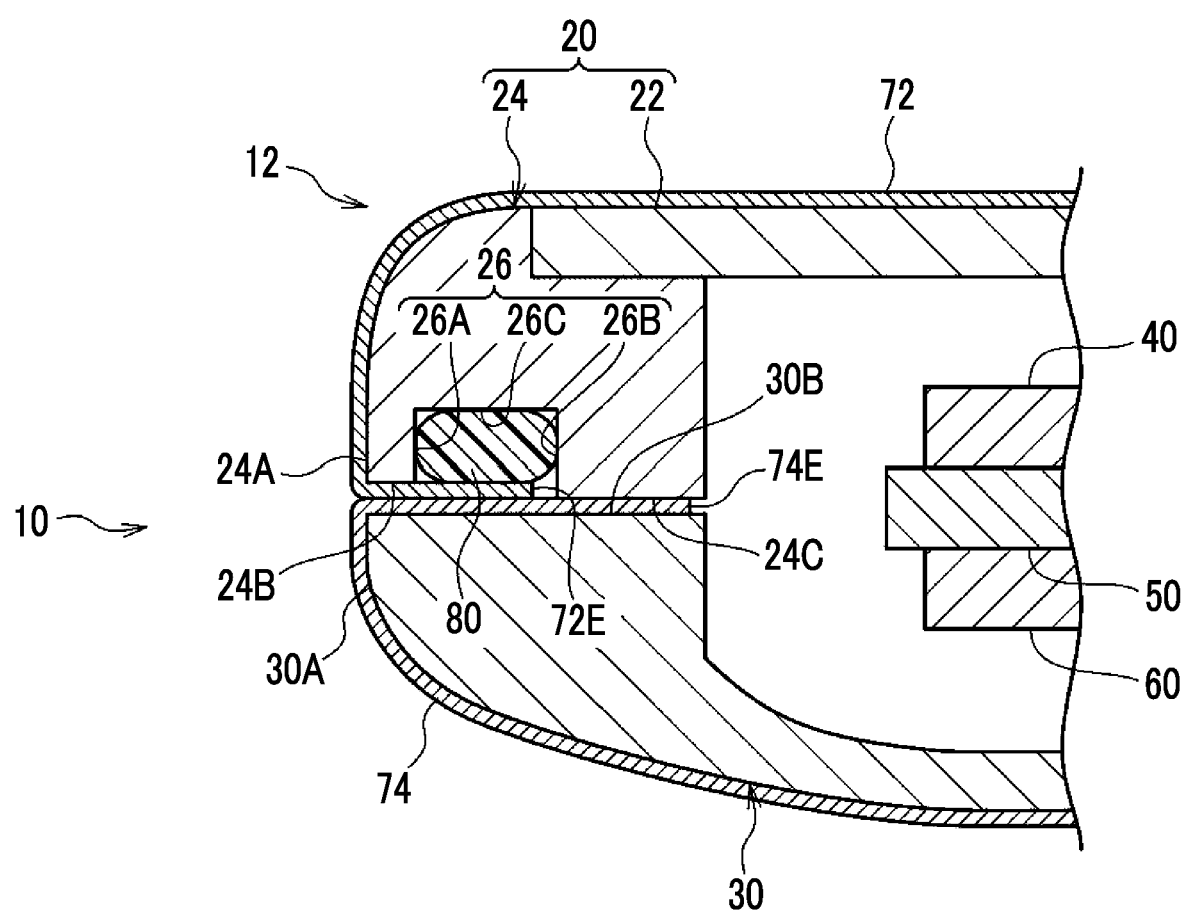
FIG. 9 is a partially enlarged cross-sectional view showing a modification example in which an end portion of the sheet material that covers the front surface member is disposed along the sheet material that covers the front surface member in the radiation detection device according to the present embodiment.

Alternatively, as shown in FIG. 9, the end portion 72E of the sheet material 72 may be disposed along the sheet material 74.

The embodiment in which the end portion 72E of the sheet material 72 is disposed along the groove bottom 26C or the sheet material 74 is suitable for a case where the compression rate (ratio of deformed dimensions at the time of compression to dimensions in a state of no load) of the packing 80 along the facing direction of the front surface member 20 and the rear surface member 30 is larger than the compression rate along the facing direction of the groove wall 26A and the inner groove wall 26B.

Figure 10:
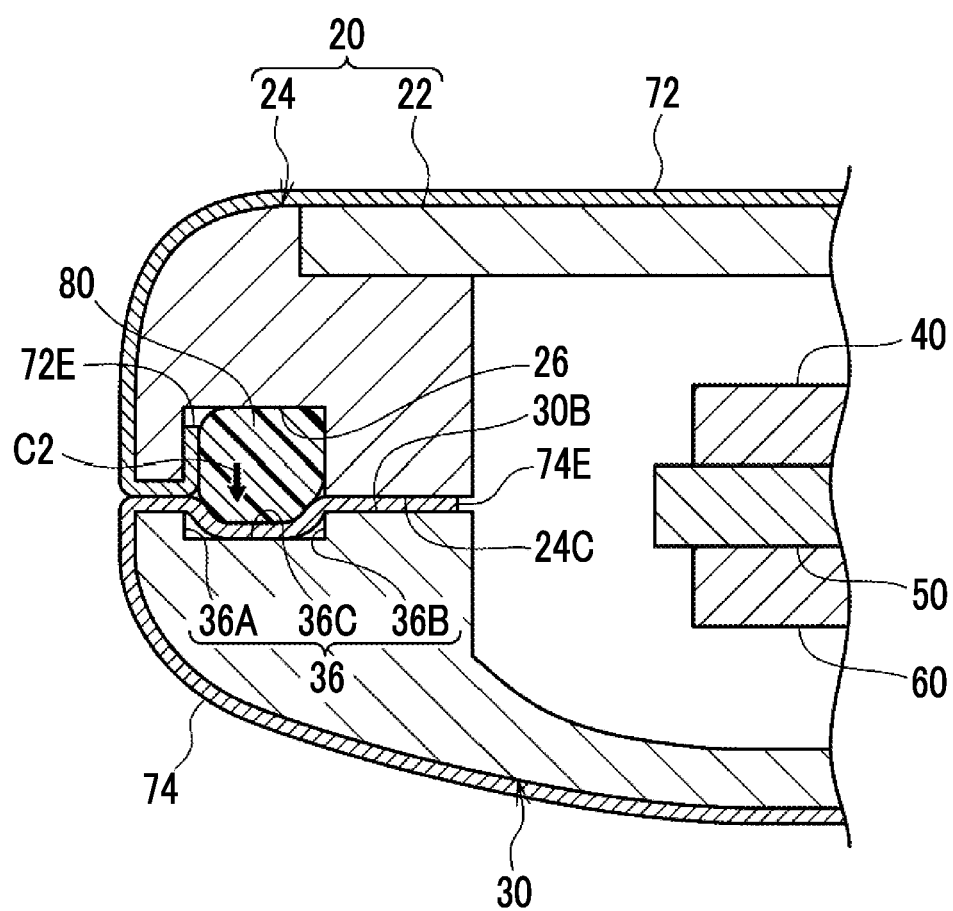
FIG. 10 is a partially enlarged cross-sectional view showing a modification example in which a groove is formed in both the front surface member and the rear surface member in the radiation detection device according to the present embodiment.

In the present embodiment, no groove is formed in the rear surface member 30, and the opposite surface 30B is a flat surface. However, the embodiment of the present disclosure is not limited thereto. For example, as shown in FIG. 10, a groove 36 may be formed on the opposite surface 30B. The groove 36 is provided at a position facing the groove 26, and is formed by a groove wall 36A, a groove wall 36B facing the groove wall 36A, and a groove bottom 36C formed between the groove wall 36A and the groove wall 36B. The sheet material 72 is inserted into the groove 26, and the sheet material 74 is pressed against the groove bottom 36C by the packing 80. In addition, the end portion 74E of the sheet material 74 is interposed between the opposite surface 30B and the opposite surface 24C.

For this reason, in a case where the front surface member 20 and the rear surface member 30 are assembled, a force can be applied to the sheet material 74 in a direction of the arrow C2. Therefore, since the sheet material 74 receives a tensile force in a direction toward the groove bottom 36C, it is possible to increase the adhesion of the sheet material 74 to the rear surface member 30.

Figure 11:
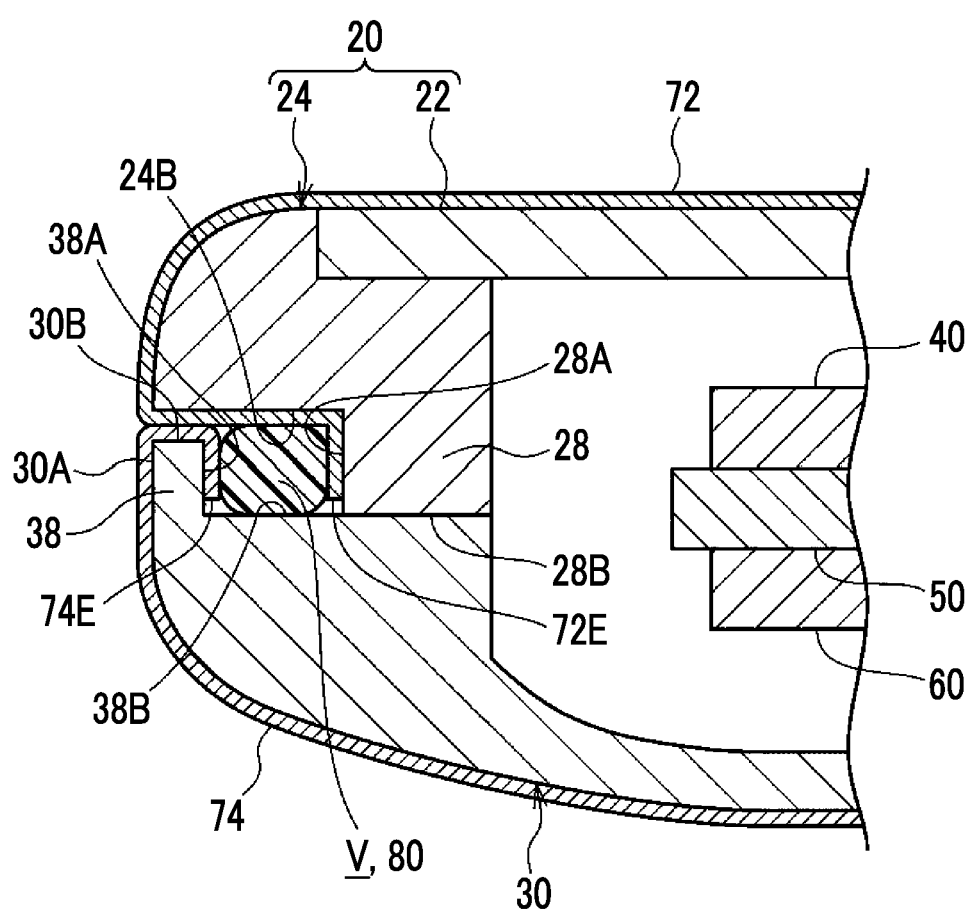
FIG. 11 is a partially enlarged cross-sectional view showing a modification example in which a holding portion is formed between an inner wall formed in the front surface member and an outer wall formed in the rear surface member in the radiation detection device according to the present embodiment.

In the present embodiment, the groove 26 is formed in the frame member 24 in the front surface member 20. However, the embodiment of the present disclosure is not limited thereto. For example, as shown in FIG. 11, no groove may be formed. Specifically, an inner wall 28 protruding toward the rear surface member 30 is provided on the opposite surface 24B of the frame member 24 facing the rear surface member 30. An opposite surface 28B, which is a top portion of the inner wall 28, and an opposite surface 38B of the rear surface member 30 are brought into contact with each other. In addition, an outer wall 38 protruding from the opposite surface 38B toward the front surface member 20 is provided. The outer wall 38 is provided on the outer side from the inner wall 28. The top portion of the outer wall 38 is the opposite surface 30B continuous with the side surface 30A.

A space V is provided between the inner wall 28 and the outer wall 38, and the packing 80 is disposed in the space V interposed between the inner wall 28 and the outer wall 38. The end portion 72E of the sheet material 72 is disposed along a wall surface 28A of the inner wall 28, and the end portion 74E of the sheet material 74 is disposed along a wall surface 38A of the outer wall 38. Thus, the "holding portion" in the present disclosure does not necessarily refer to a groove, and includes the space V formed between the inner wall 28 and the outer wall 38. While an embodiment in which a groove is provided as a holding portion can improve the holding property of the packing 80, an embodiment in which no groove is provided can improve the cleaning property of the front surface member 20 or the rear surface member 30.

In the present embodiment, both the front surface member 20 and the rear surface member 30 are covered with the sheet materials 72 and 74, respectively, the embodiment of the present disclosure is not limited thereto. For example, as shown in FIGS. 12 and 13, only the rear surface member 30 may be covered with the sheet material 74.

Figure 12:
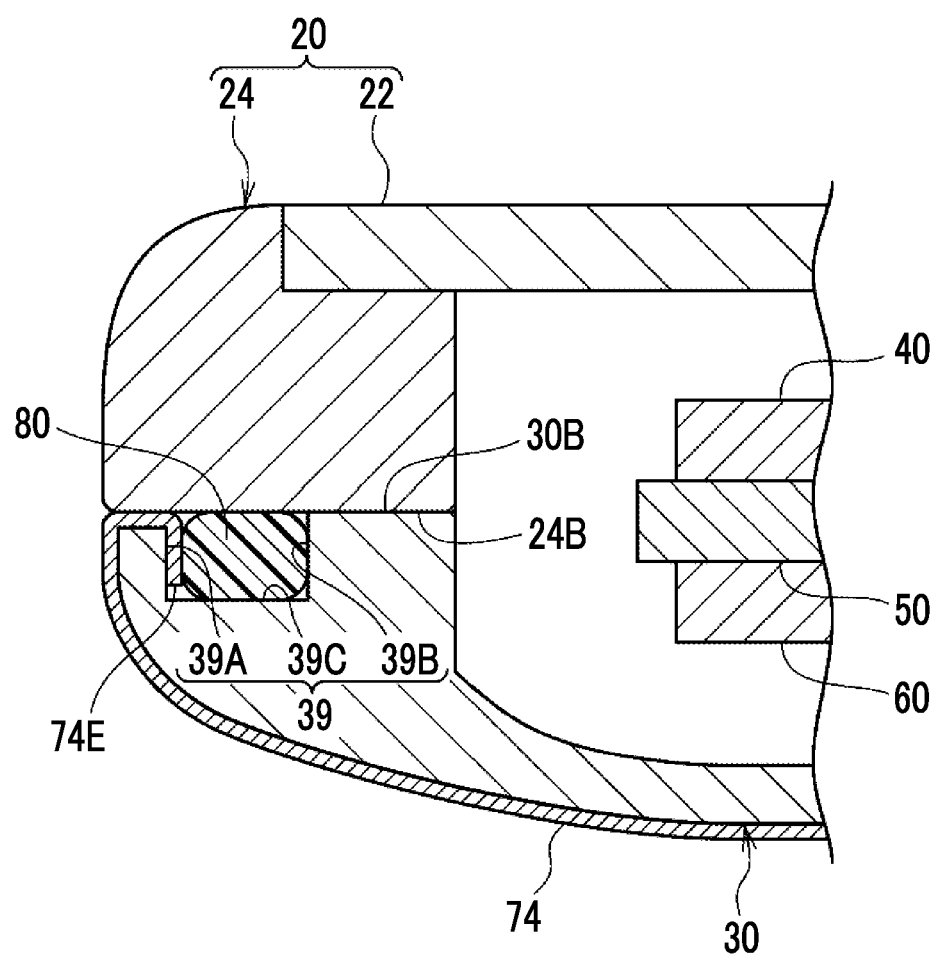
FIG. 12 is a partially enlarged cross-sectional view showing a modification example in which only the rear surface member is covered with the sheet material and a groove is formed in the rear surface member in the radiation detection device according to the present embodiment.
Figure 14:
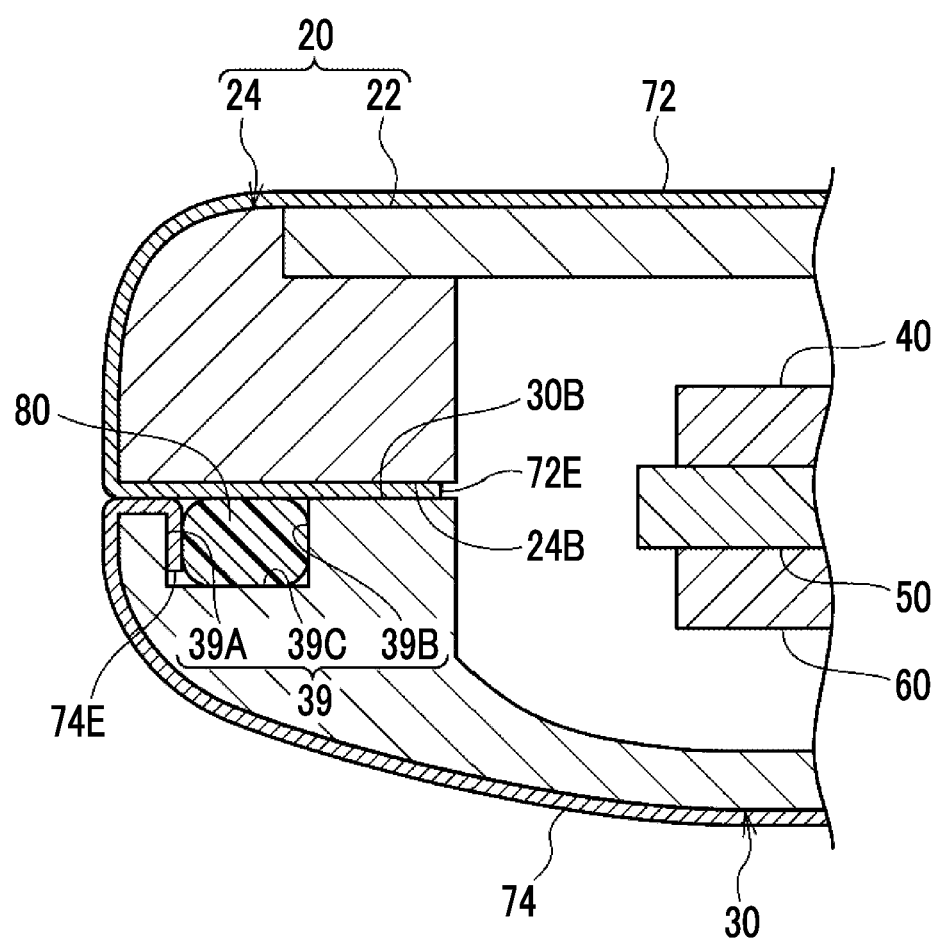
FIG. 14 is a partially enlarged cross-sectional view showing a modification example in which the front surface member and the rear surface member are covered with the sheet material and a groove is formed in the rear surface member in the radiation detection device according to the present embodiment.

In the embodiment shown in FIG. 12, the packing 80 is inserted into a groove 39 formed in the rear surface member 30, and the end portion 74E of the sheet material 74 is disposed along a groove wall 39A. The end portion 74E may be disposed along a groove bottom 39C, or may be disposed along the opposite surface 24B of the front surface member 20. The embodiment in which the groove 39 is formed in the rear surface member 30 can also be applied to a configuration in which the front surface member 20 is covered with the sheet material 72 as shown in FIG. 14.

Figure 13:
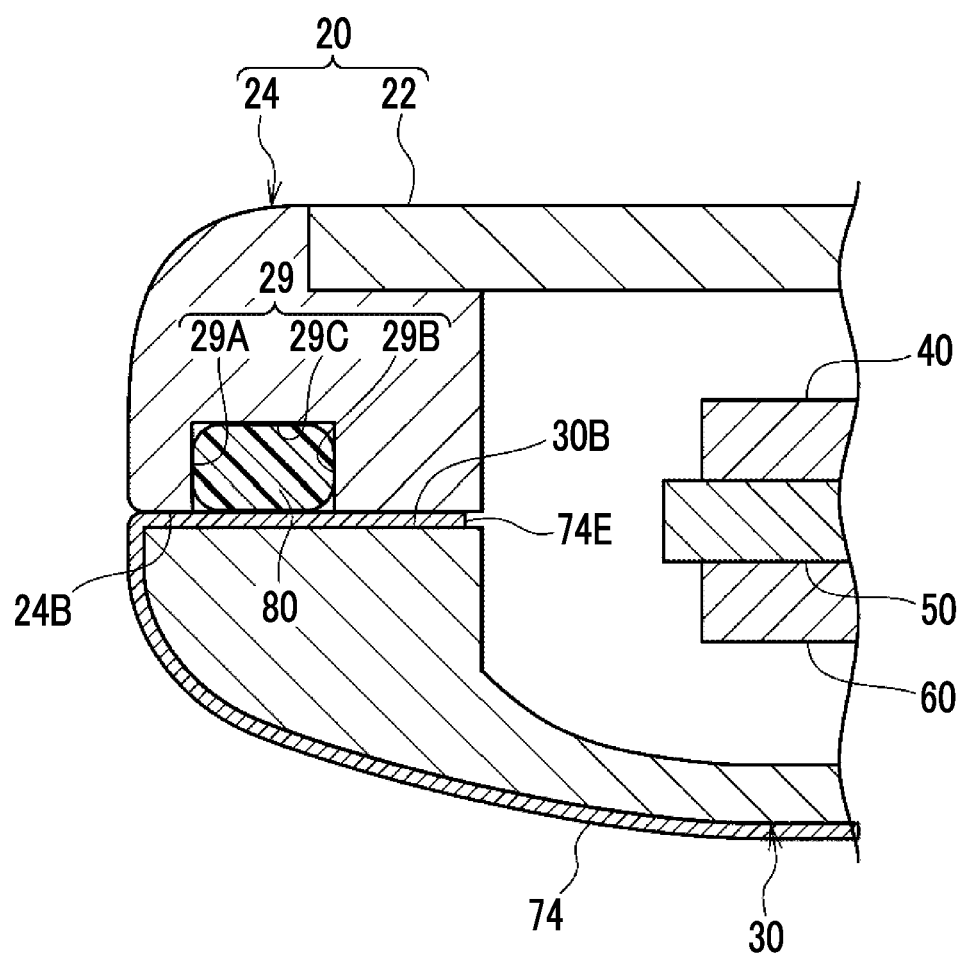
FIG. 13 is a partially enlarged cross-sectional view showing a modification example in which only the rear surface member is covered with the sheet material and a groove is formed in the front surface member in the radiation detection device according to the present embodiment.

In an embodiment shown in FIG. 13, the packing 80 is inserted into a groove 29 formed in the front surface member 20, and the sheet material 74 is interposed between the packing 80 and the opposite surface 30B. In the groove 29, a groove wall 29A and a groove wall 29B have the same height, and a groove bottom 29C is disposed between the groove wall 29A and the groove wall 29B.

FIGS. 12 and 13 show the configuration in which only the rear surface member 30 is covered with the sheet material 74. In this case, it is possible to protect at least the rear surface member 30 that is easily rubbed by the contact with the bed in a case where the radiation detection device 10 is inserted between the bed and the patient. In addition, although not shown, in the embodiment of the present disclosure, only the front surface member 20 can be covered with the sheet material 72. As described above, the present disclosure can be implemented in various forms.

What is claimed is:

1. A radiation detection device, comprising:
a front surface member;
a rear surface member assembled with the front surface member;
a radiation detection panel that is disposed between the front surface member and the rear surface member and detects radiation incident from the front surface member side;
a sheet material that covers an outer peripheral surface of at least one of the front surface member or the rear surface member;
a packing, the sheet material being interposed between the packing and the front surface member or the rear surface member; and
a holding portion that is provided in at least one of the front surface member or the rear surface member and holds the packing in a pressed state.

2. The radiation detection device according to claim 1, wherein the sheet materials cover outer peripheral surfaces of both the front surface member and the rear surface member,
the holding portion is a groove provided in either the front surface member or the rear surface member,
an end portion of one of the sheet materials is inserted into the groove, and
an end portion of the other sheet material is interposed between the front surface member and the rear surface member.

3. The radiation detection device according to claim 2, wherein the end portion of the one sheet material is disposed along a groove wall of the groove.

4. The radiation detection device according to claim 1, wherein the sheet materials cover outer peripheral surfaces of both the front surface member and the rear surface member,
the holding portion is grooves provided in both the front surface member and the rear surface member,
an end portion of one of the sheet materials is inserted into one of the grooves, and
the other sheet material is pressed against a groove bottom of the other groove by the packing, and an end portion of the other sheet material is interposed between the front surface member and the rear surface member.

5. The radiation detection device according to claim 1, wherein the sheet materials cover outer peripheral surfaces of both the front surface member and the rear surface member,
the holding portion is a space interposed between an inner wall protruding from the front surface member toward the rear surface member and an outer wall protruding from the rear surface member toward the front surface member,
one of the sheet materials is disposed along the inner wall, and
the other sheet material is disposed along the outer wall.

6. The radiation detection device according to claim 1, wherein the sheet material covers an outer peripheral surface of one of the front surface member and the rear surface member,
the holding portion is a groove provided in one of the front surface member and the rear surface member, and
the sheet material is interposed between the packing and the front surface member or the rear surface member covered with the sheet material.

7. The radiation detection device according to claim 1, wherein an angle formed by a side surface of the front surface member covered with the sheet material and an opposite surface of the front surface member facing the rear surface member and an angle formed by a side surface of the rear surface member covered with the sheet material and an opposite surface of the rear surface member facing the front surface member are 45° or more.

8. The radiation detection device according to claim 1, wherein each of the front surface member and the rear surface member has a quadrangular shape with a corner portion formed in a curved shape, and
each of an opposite surface of the front surface member facing the rear surface member and an opposite surface of the rear surface member facing the front surface member has a frame shape, and a width of the corner portion is larger than widths of other portions.

9. The radiation detection device according to claim 1, wherein a support plate that supports the radiation detection panel is disposed between the front surface member and the rear surface member, and
the support plate is formed of a MgLi alloy.

10. A method of manufacturing a radiation detection device, comprising:
a step of covering outer peripheral surfaces of a front surface member and a rear surface member with sheet materials;
a step of inserting an end portion of one of the sheet materials into a groove provided on an opposite surface of the front surface member facing the rear surface member and disposing a packing in the groove;
a step of disposing the other sheet material along an opposite surface of the rear surface member facing the front surface member; and
a step of assembling the front surface member and the rear surface member to press the packing and interposing the other sheet material between the packing and the opposite surface.

11. The method of manufacturing a radiation detection device according to claim 10,
  wherein the one sheet material is heated and softened before covering the outer peripheral surface of the front surface member with the one sheet material,
  the front surface member is pressed against the one sheet material, which has been softened, at the time of covering the outer peripheral surface of the front surface member with the one sheet material,
  the other sheet material is heated and softened before covering the outer peripheral surface of the rear surface member with the other sheet material, and
  the rear surface member is pressed against the other sheet material, which has been softened, at the time of covering the outer peripheral surface of the rear surface member with the other sheet material.

\* \* \* \* \*